US006781133B2

(12) United States Patent
Karplus et al.

(10) Patent No.: US 6,781,133 B2
(45) Date of Patent: Aug. 24, 2004

(54) POSITION SENSITIVE SOLID STATE DETECTOR WITH INTERNAL GAIN

(75) Inventors: Eric Karplus, East Falmouth, MA (US); Richard Farrell, East Killingly, CT (US); Kanai Shah, Waltham, MA (US)

(73) Assignees: Radiation Monitoring Devices, Inc., Watertown, MA (US); Science Wares, Inc., East Falmouth, MA (US)

( * ) Notice: Subject to any disclaimer, the term of this patent is extended or adjusted under 35 U.S.C. 154(b) by 228 days.

(21) Appl. No.: 10/035,684

(22) Filed: Nov. 1, 2001

(65) Prior Publication Data

US 2003/0080298 A1 May 1, 2003

(51) Int. Cl.[7] ................................................. G01T 1/24
(52) U.S. Cl. ............................... 250/370.1; 250/370.11; 257/429
(58) Field of Search ......................... 250/370.1, 370.11, 250/370.14, 367, 368; 257/429, 438, 291, 293, 428, 433, 436, 440

(56) References Cited

U.S. PATENT DOCUMENTS

| | | | |
|---|---|---|---|
| 4,749,849 A | | 6/1988 | Hoeberechts et al. |
| 4,874,939 A | | 10/1989 | Nishimoto et al. |
| 5,021,854 A | | 6/1991 | Huth |
| 5,144,141 A | * | 9/1992 | Rougeot et al. ............ 250/369 |
| 5,146,296 A | * | 9/1992 | Huth ......................... 257/429 |
| 5,446,308 A | | 8/1995 | Piccone et al. |
| 5,461,226 A | * | 10/1995 | Nicoli et al. .......... 250/214 VT |
| 5,500,376 A | | 3/1996 | Ishaque et al. |
| 5,757,057 A | | 5/1998 | Dabrowski |
| 5,786,597 A | | 7/1998 | Lingren et al. |
| 6,111,299 A | | 8/2000 | Dabrowski et al. |
| 6,521,894 B1 | * | 2/2003 | Iwanczyk et al. ...... 250/370.11 |
| 6,541,836 B2 | * | 4/2003 | Iwanczyk et al. ........... 257/429 |

OTHER PUBLICATIONS

C. Carrier R. Lecomte, "Recent Results in Scintillation Detection with Silcon Avalanche Photodiodes", IEEE Trans. Nuci. Sci. 37(2). 209 (1990).

G.C. Huth, "Recent results obtained with high field internally amplifying semiconductor radition detectors", IEEE Trans. Nuci. Sci. NS–13 (1), 36 (1986).

F. Martin, G. Entine, R. Farrell, "Measurements of the operating characteristics of a Large–area avalanche photodiode", Optical Engineering, 31 (1), 48 (1992).

M.R. Squillante et al, "Avalanche Diode Low Energy X–Ray and Nuclear Particle Detector", IEEE Trans. Nuci. Sci. 33(1), 336 (1986).

G.E. Stillman, C.M. Wolfe, Chapter 5 in "Semiconductors and Semimetals" R.K. Willardson, A.C. Seer Ed., vol. 12, 291 (1977).

R. Farrell, K. Vanderpuye, G. Entine, M.R. Squillante, "High Resolution, Low Energy Avalanche Photodiode X–Ray Detectors", IEEE Trans. Nuci, Sci. 38(2), 144 (1991).

J.A. Hauger et al., "A Time–of–Flight detector based on Silicon avalanche diodes", Nuci. Instrum. Meth. A337, 362 (1994).

(List continued on next page.)

Primary Examiner—Constantine Hannaher
Assistant Examiner—Otilia Gabor
(74) Attorney, Agent, or Firm—Townsend and Townsend and Crew LLP (57) ABSTRACT

The present invention is a solid state detector that has internal gain and incorporates a special readout technique to determine the input position at which a detected signal originated without introducing any dead space to the active area of the device. In a preferred embodiment of the invention, the detector is a silicon avalanche photodiode that provides a two dimensional position sensitive readout for each event that is detected.

50 Claims, 7 Drawing Sheets

OTHER PUBLICATIONS

J. Kim, Y. Yamamoto, H. Hogue, "Noise free avalanche multiplication in Si Solid state photomultipliers", Appl. Phys. Lett. 70(21), pp. 2852–2854 (1997).

SB Kaufman. BD Wilkins, MJ Fluss, EP Steinberg, "The response of Position–sensitive detectors to fission fragments and other heavy Ions", Nuci. Inst. Meth., 82, 117 (1970).

E. Gramsch, S. Zhang, M. Madden, M. Lindberg, M. Szawlowski, "High density avalanche photodiode array", Proc. SPIE vol. 2022, Oct. 1993, p. 111–119.

R.B. Owen, M.L. Awcock, "One and two Dimensional Position Sensing Semiconductor Detectors", IEEE Trans. Nuci Sci. NS–15, 290 (1968).

B.O. Kelly, "Lateral–Effect Photodiodes", Laser Focus, Mar. 1976, pp. 38–40.

K. Kurasawa, "An Application of PSD to Measurement of Position", Journal of the Japan Society of Precision Engineering, vol 51, No. 4, 1985, pp. 730–737.

M. Lampton, C.W. Carlson, "Low distortion resistive anodes for two–dimensional position–sensitive MCP systems", Rev. Sci. Instrum. 50(9), pp. 1093–1097.

J.S. Lapington J. Milnes, M. Page, M. Ingle. K. Rees, "Novel Electronic Readout Systems For Photon Counting Imagers", Proc. of SPIE, vol. 4128, 2000, pp. 120–128.

C. Martin, P. Jelinsky, M. Lampton, R.F. Malina, H.O. Anger, "Wadge–and–strip anodes for centroid finding position–sensitive photon and particle dectectors", Rev. Sci. instru. 52(7), Jul. 1981, pp. 1067–1074.

* cited by examiner

POSITION SENSITIVE SOLID STATE DETECTOR WITH INTERNAL GAIN

STATEMENT REGARDING FEDERALLY SPONSORED RESEARCH AND DEVELOPMENT

This invention is partially the result of work supported by the National Science Foundation under grant contract number DMI-9901717 and grant contract number DMI-9761316.

BACKGROUND

1. Field of Invention

This invention describes methods of obtaining position of incidence information from solid state devices, such as avalanche photodiodes, without introducing any dead space to the detector's active area.

2. Discussion of Prior Art

Many applications in science and industry require detectors that are capable of reporting time and position of incidence information for discrete quantum units of radiation such as single photons and beta particles. A single photon is understood to be a unit of radiation with an energy described by $E=hc/\lambda$, where $\lambda$ is the wavelength of the radiation. In some cases it is most expedient to convert a high energy photon into a group of multiple lower energy photons and then detect the group of lower energy photons as a single event corresponding to the lower energy photons. This is typically achieved using fluorescent materials such as scintillators.

Detectors for these applications will ideally have an output that gives a rapid position sensitive readout with a good signal to noise ratio. In order to achieve a good signal to noise ratio, it is beneficial for the detector to have internal gain. The detector should also have good detection efficiency over a large active area and a wide dynamic range. Furthermore, the active area should cover a significant portion of the detector's physical footprint and allow for efficient tiling to cover areas greater than the practical size of a discrete detector. In some applications, it is desirable for the detector to be capable of operating effectively in a high magnetic field. It is also beneficial if the detector has low power requirements, especially for applications that require many detector elements. A number of technologies have been developed in an effort to satisfy these requirements. These technologies fall into two main categories: vacuum tube detectors and solid state detectors.

Vacuum Tube Detectors

Vacuum tube detectors include photomultiplier tubes, image intensifiers, and imaging photon detectors. These detectors have a photocathode that converts incident radiation outside the detector envelope into electrons inside the detector envelope. Electrons from the photocathode are then amplified inside the detector envelope, typically using a system of dynodes or microchannel plates that confine the amplification process to remain spatially centered about the position at which the electrons originated from the photocathode. The bundles of electrons resulting from the amplification process are then collected on an anode structure that can provide a position sensitive readout, and the position of the incident radiation is then determined from this readout.

Vacuum tube detectors can achieve gains in excess of $10^6$ with relative ease, and can provide sub-nanosecond readout. However, they are limited by the quantum efficiency of the photocathode material, which in practice is typically in the range of 10–20%. In addition, the input window on which the photocathode is formed is generally made of glass or a fiber optic faceplate that is a few millimeters thick. Both methods introduce optical losses when the detector is used with proximity-focused scintillator arrays. Detectors that use microchannel plate structures for internal amplification suffer from a localized dead time on the order of 10–100 milliseconds, which severely limits the realizable dynamic range of the detector for detecting sequential pulses of radiation. Vacuum tube detectors are also frequently constructed in a round enclosure, which is inefficient for tiling to cover large areas. Furthermore, magnetic fields that are not parallel to the electron transit path inside the vacuum enclosure will always cause geometric distortion in a position sensitive readout and may affect gain as well.

Solid State Detectors

There are two main types of solid state detectors that are used in the radiation detection applications described above: photodiodes and avalanche photodiodes (APDs). The fundamental difference between these two types of detectors is that avalanche photodiodes have internal gain, while photodiodes have no gain. This makes APDs a better choice than photodiodes in applications where small signals with low background must be detected with wide bandwidth at high frequencies. Positron Emission Tomography (PET) is a classic example of this type of application, where the timing coincidence of individually detected gamma rays must be measured to within a few nanoseconds while maintaining good energy resolution and high signal throughput. Similar applications exist in high energy physics, LIDAR, and LADAR.

Owen ("One and Two Dimensional Position Sensing Semiconductor Detectors", IEEE Trans. Nucl. Sci. NS-15, p.290+, 1968), Kelly ("Lateral-Effect Photodiodes", Laser Focus, Mar. 1976, pp. 38–40) Kurasawa ("An Application of PSD to Measurement of Position", Precision Instrument, Vol 51, No. 4, 1985, pp. 730–737) and others have shown methods of obtaining position sensitive information from solid state detectors with no internal gain. A number of companies including Hamamatsu, UDT, and Silicon Sensor sell 'lateral effect' position sensing photodiode products that use similar methods. However, because they are photodiodes that have no internal gain, all of these detectors are limited to applications that have relatively low bandwidth requirements and a relatively high background when compared to what is possible with avalanche photodiodes.

An APD is a semiconductor device that is constructed in such a way that a large electric field can be created inside the semiconductor material with a very low leakage current. Any free carriers that enter the electric field region will be accelerated out of it. If the size of the electric field region is large relative to the mean fire path of the carriers, then there is a high probability that a free carrier will gain enough energy to liberate other carriers in the space charge region, which will in turn be accelerated. This avalanche effect continues until the free carriers get accelerated out of the space charge region and either recombine or are extracted from the device. The device is designed such that when an electron-hole pair is created in the top layer, a charged carrier will drift into the high field region of the device and experience avalanche multiplication. The avalanche process gives APDs internal gain, which is very useful for detecting low levels of electromagnetic radiation.

There are a number of reasons why the prior art methods for extracting position sensitive information from photodiodes cannot be directly extended to work with APDs. Before considering how to obtain position sensitive information, however, it is important to recognize that substantially different approaches must be used to design and fabricate a non-position sensitive APD as compared to a non-position sensitive photodiode with the same active area. This is because the internal fields in APDs are much higher than the internal fields in photodiodes, so a field spreading structure is required to avoid edge breakdown when bias is applied to an APD. The details of these methods are well known to those skilled in the art.

The design of a position sensitive APD must give special consideration to the placement of contacts on the device in order to avoid electrical interaction with the field spreading structure. The contact method also affects the package design, which can in turn affect the usability of the detector in tiling applications. In addition, while photodiodes can receive uniform surface treatments to achieve a position sensitive readout, most surface treatments will need to be modified in order to be compatible with the field spreading structure in an APD. Furthermore, it can be advantageous to extract position sensitive information from the majority carrier signal on the cathode in order to avoid modifying the anode structure in ways that could significantly affect the sensitivity or response uniformity of the device. If position determining signals are only extracted from the cathode of the device, then only one side of the device is used to produce a position sensitive signal, whereas in many position sensitive photodiode configurations both sides of the device are used without substantially affecting the sensitivity or response uniformity of the device.

The ability to fabricate commercially viable large area, high gain avalanche photodiodes is a fairly recent development. The prior art for extracting high resolution position sensitive information from large area avalanche photodiodes consists of creating an array of discrete pixels on a monolithic device (for example, Huth U.S. Pat. No. 5,021,854; Dabrowski U.S. Pat. No. 5,757,057 and U.S. Pat. No. 6,111,299, Ishaque U.S. Pat. No. 5,500,376, Gramsch et.al. "High density avalanche photodiode array," Proc. SPIE Vol. 2022, October 1993, p. 111–119). This prior art appears to indicate a preference for forming discrete pixel boundaries in order to limit charge spreading inside the device during the gain process so the signal can be read out using one contact. The physical location of the pixel then determines the position of the signal, with the physical size of the pixel determining the spatial resolution of the device. Contrary to this prior art, the present invention uses charge spreading in the device as a beneficial mechanism for obtaining position sensitive information, rather than as a problem that should be minimized. The present invention can achieve sub-millimeter spatial resolution over a large area using a small number of amplifier channels; typically 2 channels for a one dimensional measurement and 4 channels for a two dimensional measurement. By capitalizing on the charge spreading characteristic of large area APDs that was previously considered undesirable for obtaining position resolution, the inventors have been able to develop the methods disclosed in this invention for obtaining position sensitive information from a solid state detector with internal gain.

While the prior art approach of building an array of pixels to capture position information has benefits for certain applications, there will always be either some degree of cross-talk between adjacent pixels, or else some dead space in between the pixels. The problem of cross-talk between pixels can significantly complicate the signal readout, especially when energy resolution of the signal is important, and reducing the pixel size to improve resolution tends to increase cross talk problems. Various approaches presented in prior art that minimize cross-talk between pixels introduce dead space between the pixels. As pixel size is decreased to improve spatial resolution, the ratio of active area to physical device area decreases, which can significantly reduce the amount of signal collected, which adversely affects signal to noise ratio as well as energy resolution. In addition, the number of electrical connections to the device increases in proportion to the square of the decrease in pixel size. The risk that fabricated devices will contain or develop dead or poorly functioning pixels adversely affects the manufacturing process yield as well as the value of the manufactured product. Furthermore, as the number of pixels is increased, the complexity and cost of the readout electronics also increases, especially in applications such as PET where coincidence determinations must be made using signals that extend over a large number of pixels.

Prior art methods for determining position of incidence with high resolution over an extended area focus on determining which element in an array contains the desired signal. In contrast to prior art, positions in the present invention are preferably determined by implementing a calculation based on the relative amplitudes of a plurality of signals measured at substantially the same time. This is a significant improvement over prior art because a small number of preamplifier channels can be used to read out position-determining signals from a large active area with high resolution, and a single amplifier channel can be used to provide a fast timing signal for coincidence detection of the signal from any position within said area.

In comparison with vacuum tube devices, solid state devices immediately overcome a number of disadvantages. The quantum efficiency of APDs in practice is typically in the range of 40–60%, and can exceed 70%. This higher quantum efficiency relative to vacuum tube devices often more than compensates for the higher excess noise of APDs. The detection of radiation by an APD occurs within less than a micron of the physical surface of the device, so proximity focusing to scintillator arrays or phosphors is very efficient. The response time of large area APDs is typically on the order of a few nanoseconds, which is comparable to many vacuum tube detectors and more than adequate for many radiation detection applications. Furthermore, the internal gain mechanism in APDs does not introduce a localized dead time that would limit dynamic range for detecting sequential events at the same position of incidence in the same way that microchannel plate based vacuum detectors are limited.

APDs can be manufactured at low cost using highly scalable manufacturing processes, which makes it possible to achieve a lower cost per unit of detector active area relative to vacuum tube detectors. APDs are very compact and light weight, and can also easily be fabricated in a rectangular format with a high active area to device footprint ratio, which makes them very well suited to applications requiring efficient tiling. The power requirement per unit of active area for APDs is generally less than for vacuum tube detectors, primarily because they can be operated without the voltage divider circuit that is required for proper biasing of the amplifying elements in vacuum tube devices. Finally, APDs are orders of magnitude less susceptible to geometric distortion of a position sensitive readout due to transverse magnetic fields, primarily because the electron transit path is much shorter, and also because the Hall effect will result in a compensating electric field being set up inside the device that tends to cancel the effect of the magnetic field.

OBJECTS AND ADVANTAGES

The approaches presented here for obtaining position sensitive information from solid state devices with internal gain offer a number of important advantages over prior art in terms of performance, ease of use, and manufacturability.

Figure 1:
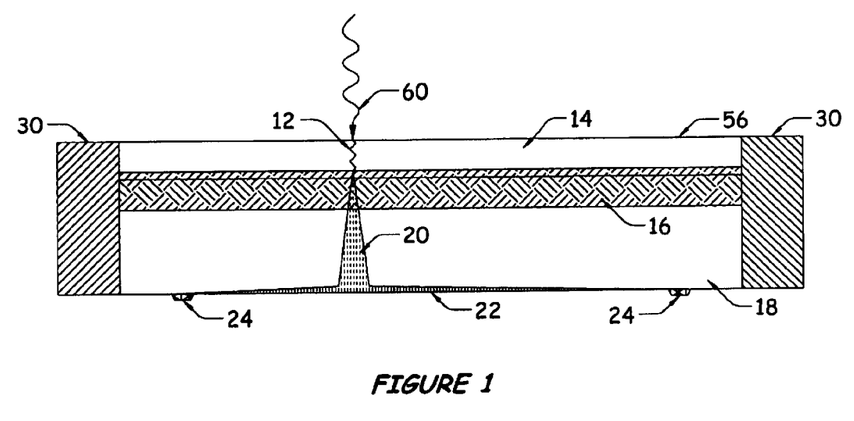
FIG. 1 shows the conceptual operation of a Position Sensitive APD.
Figure 3A:
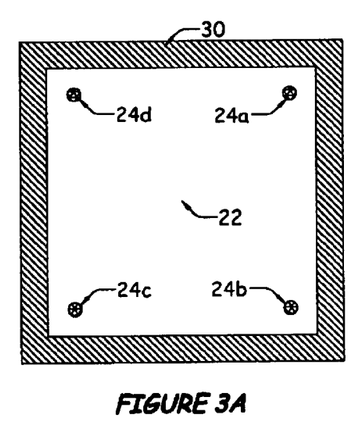
FIG. 3A shows a corner cathode position sensitive readout approach for a Position Sensitive APD.

Our invention consists of a special readout technique that makes it possible to obtain spatial information from within a continuous active area of a solid state detector with internal gain. Since the avalanche event in a solid state device begins at a distinct location inside the semiconductor material, the propagation of the avalanche inside the device is physically centered about the point of initiation as shown in FIG. 1. Contrary to the teaching of prior art, we found that it is possible, and in some cases preferable, to determine the location of that point using position-dependent charge separation techniques similar to those used in other position sensitive detectors. Such techniques are illustrated in FIGS. 3 and 4 and include, but are not limited to, a resistive cathode sheet with one or more contacts, or one or more patterned cathode contacts. A cathode of an APD is understood to be a contact of the device that has a negative potential relative to the anode when the device is forward biased.

Figure 3C:
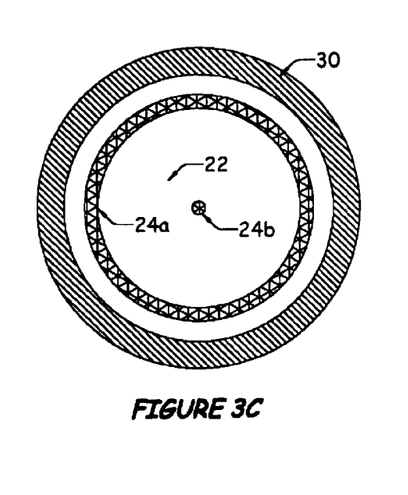
FIG. 3C shows concentric ring contacts for measuring radial displacement.
Figure 4A:
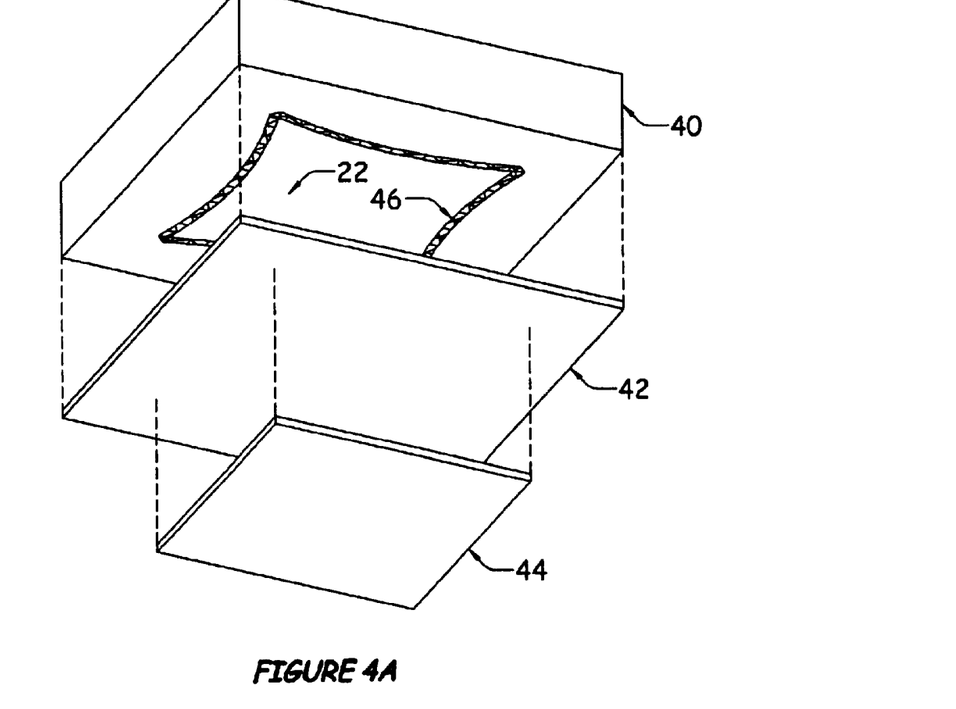
FIG. 4A shows a method for reading out a Position Sensitive APD using mirror charge.
Figures 4B, 4C:
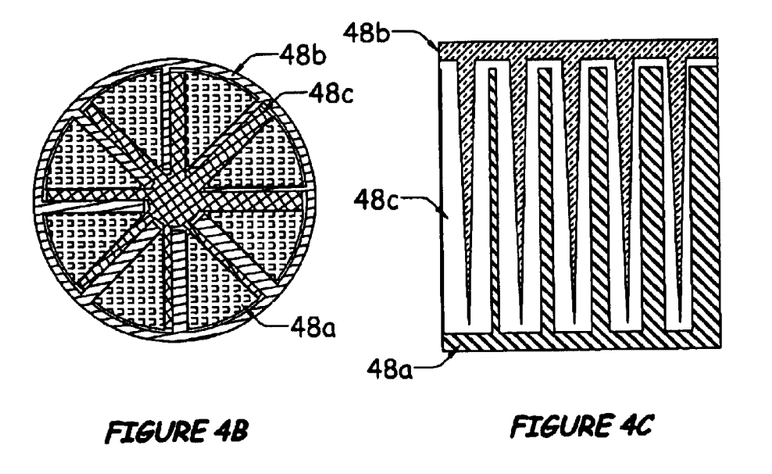
FIG. 4B shows a polar coordinate encoding anode pattern for use with a mirror charge readout.
FIG. 4C shows a Cartesian coordinate encoding anode pattern for use with a mirror charge readout.

This method offers a simple fabrication process, an easy readout approach even at very high effective pixel densities, and no dead space over the entire active area. This method also makes it easy to implement contact patterns that give a non-rectangular position readout as shown in FIGS. 3C and 4B.

Further objects and advantages of this invention will become apparent from a consideration of the drawings and ensuing description.

DRAWING FIGURES

In the drawings, closely related figures have the same number but different suffixes.

SUMMARY

The present invention is a solid state detector that has internal gain and incorporates a special readout technique to determine the input position at which a detected signal originated without introducing any dead space to the active area of the device. In a preferred embodiment of the invention, the detector is a silicon avalanche photodiode that provides a two dimensional position sensitive readout for each event that is detected.

DESCRIPTION OF INVENTION

Figure 2A:
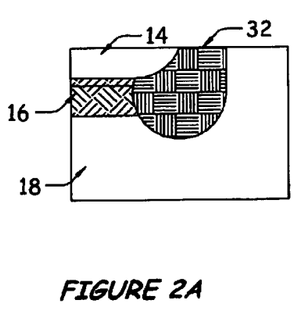
FIG. 2A shows a guard ring field spreading structure.
Figure 2B:
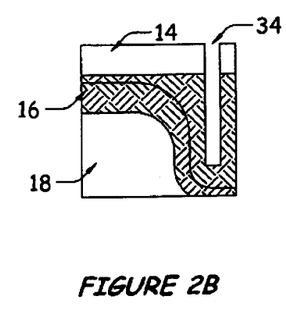
FIG. 2B shows a planar bevel field spreading structure.
Figure 2C:
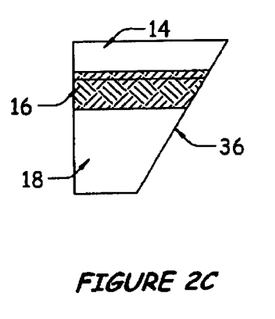
FIG. 2C shows a beveled edge field spreading structure.

FIG. 1 shows a cross-section schematic of the conceptual operation of the invention. In a typical embodiment, a large area APD is fabricated in the usual way. It can be beneficial to the spatial resolution performance of the detector to minimize the thickness of the undepleted material on both sides of the depletion region 16, especially on the input side of the detector 14, in order to minimize the spread of minority carriers 12 produced by the input signal 60. In a preferred embodiment, an n silicon substrate 18 is doped with p materials using a deep diffusion process. A field spreading structure 30 such as a guard ring 32 (FIG. 2A), diffused bevel 34 (FIG. 2B), or mechanical bevel 36 (FIG. 2C) is incorporated into the semiconductor material to avoid edge breakdown under high reverse bias. Other field spreading structures are possible and are considered to be within the scope of this invention. Prior to applying a passivation layer to the cathode side of the device, a photomask is applied to mask off a contact pattern. The contact pattern can be somewhat arbitrary, but it is necessary that the cathode contacts 24 be sufficiently far from exposed features of the field spreading structure 30 so that arcing of the high voltage from the bulk material to the cathode contacts 24 will not occur. In a preferred embodiment, this distance is at least 30 mils. The location of the cathode contacts can be optimized based on the needs of the application for which the detector is being designed. In the case of two dimensional imaging over a continuous area, one method of optimization involves maximizing the distance between the contacts without enabling undesirable breakdown phenomenon between the cathode contacts 24 and the field spreading structure 30; this provides a large central area of the device in which the need for distortion correction, whether built into the device or applied through signal processing, is minimized.

There are a variety of methods for generating the photomask and transferring it to a photoresist on the device. These methods are well known to people skilled in the art of semiconductor fabrication. In a preferred embodiment, a UV-activated photoresist is spun onto an APD substrate, and a contact imaging method is used to transfer the mask into the photoresist. The unmasked portion of the cathode is then etched back into the substrate far enough to produce a moderate resistivity (hundreds to thousands of ohms) between the masked contact areas. The optimum etch depth depends on the doping profile and desired operation characteristics of the device. The etch depth does not appear to be critical, as long as it gets close to the depletion region of the device 16 when it is under bias to enhance charge spreading 20 to the contacts 24. In a preferred embodiment, the etch depth is on the order of a few tens of microns. By small modifications in the backside preparation, this can be reduced with the benefit of being able to make smaller contact points, with the goal of improving resolution. Smaller contacts may give higher resolution, but they will have higher resistance and therefore a slower signal response. One of ordinary skill in the art can balance these effects based on the needs in particular applications.

A highly conductive path can be applied around the perimeter of the anode contact of the device 56 with the goal of minimizing the bipolar response that can be observed in the signals from the cathode contacts under certain biasing conditions. In one embodiment of this invention, the conductive path is constructed by applying a thin coating of indium around the perimeter of the anode structure. The conductive path is thought to ensure a more uniform availability of charged carriers to replenish those carriers transported out of the device during each avalanche event.

Figure 3B:
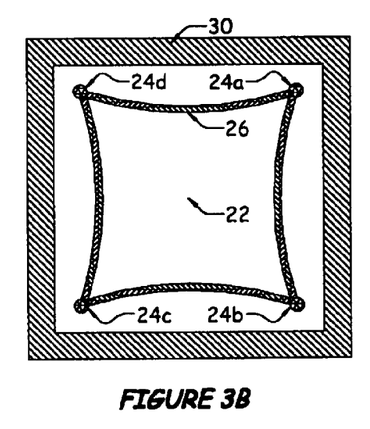
FIG. 3B shows corner cathode contacts with arc termination lines to remove geometric distortion.
Figure 6A:
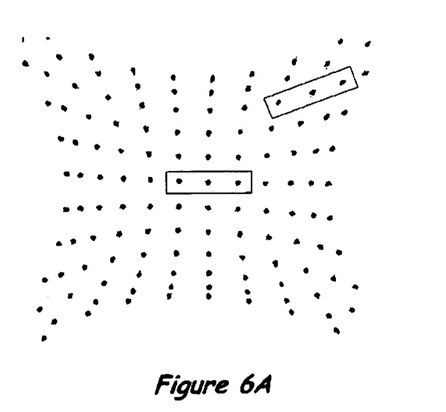
FIG. 6A shows the results of using an optical pulser to evaluate the imaging performance of a two dimensional Position Sensitive APD with a corner contact readout as shown in FIG. 3A.
Figure 6B:
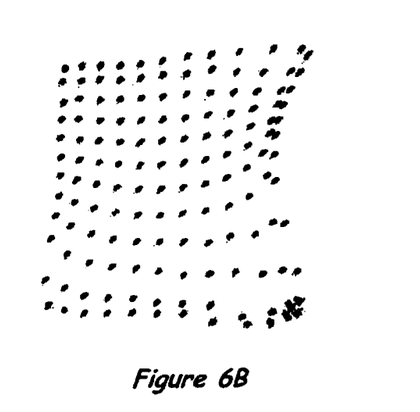
FIG. 6B shows the results of using an optical pulser to evaluate the imaging performance of a two dimensional Position Sensitive APD with an arc terminated corner contact readout as shown in FIG. 3B.

In one embodiment of this invention shown in FIG. 3B, termination lines 26 are added between the contact pads 24 to compensate for pincushion distortion shown in FIG. 6A. The termination lines can be constructed in a variety of ways, as long as they make good electrical contact with the substrate material 18. In one embodiment, the termination lines are created using the same photomask and etch process that defines the cathode contacts. In this embodiment, the width of the termination line in the mask is chosen so that the undercutting below the photoresist during the etch process will leave a thin ridge below the defined termination line. In the case where four corner contacts are used with a square active area device, the termination lines should be formed in an arc with radius $a=r/R$, where r is the sheet resistivity in ohm-cm and R is the total resistance of the termination line between the contacts. In one embodiment of this invention, an arc radius of 2 inches was used, and the termination line width in the photomask was 5 mils. The effect of this method on the readout distortion is shown in FIG. 6B. The impact of non-uniformities in the termination line structure can be seen towards the right and bottom edges of the image in FIG. 6B.

The pincushion distortion of a corner contact device such as the one shown in FIG. 3A can also be corrected using a variety of computational methods. For example, a reference image can be obtained from a fixed pattern with known geometry and used to calculate a mathematical transformation that will eliminate the distortion by mapping 'measured' coordinates to 'true' coordinates. In many applications, however, it may not be necessary to remove the pincushion distortion in order for the position sensing capabilities of the detector to be useful.

Figure 3D:
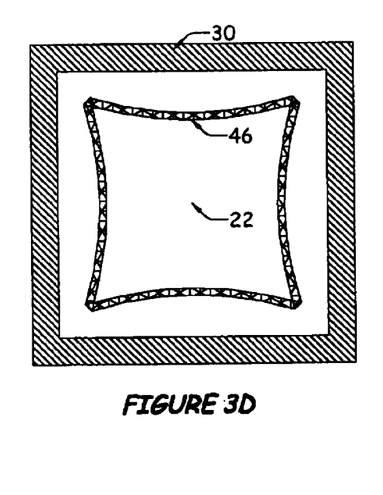
FIG. 3D shows arc contacts for mirror charge readout using patterned anodes.

In another embodiment of this invention shown in FIG. 4, the signal from the charge collected on a high resistivity cathode sheet 22 in an APD could be capacitively coupled to a patterned readout contact structure 44 separated from the cathode of said APD by an insulating dielectric layer 42. In this configuration, a single cathode contact 46 suitably disposed around the perimeter of the cathode surface could be used, as shown in FIG. 3D. It is important for the cathode contact 46 to be far enough from the field spreading structure 30 so that arcing of the high voltage from the bulk material to the cathode contacts will not occur. It is also important that the conductors 48a, 48b, 48c be electrically isolated from each other and that they be sufficiently insulated from the high voltage of the bulk material to avoid arcing. Such readouts could offer greater flexibility in changing the position-sensitive readout geometry without altering the fabrication process for the semiconductor portion of the detector. Possible readout patterns include arrays of individual contacts, which would make it possible to achieve signals similar to what prior art pixilated devices offer in applications where pixel-style readouts are preferable.

OPERATION OF INVENTION

Figure 5:
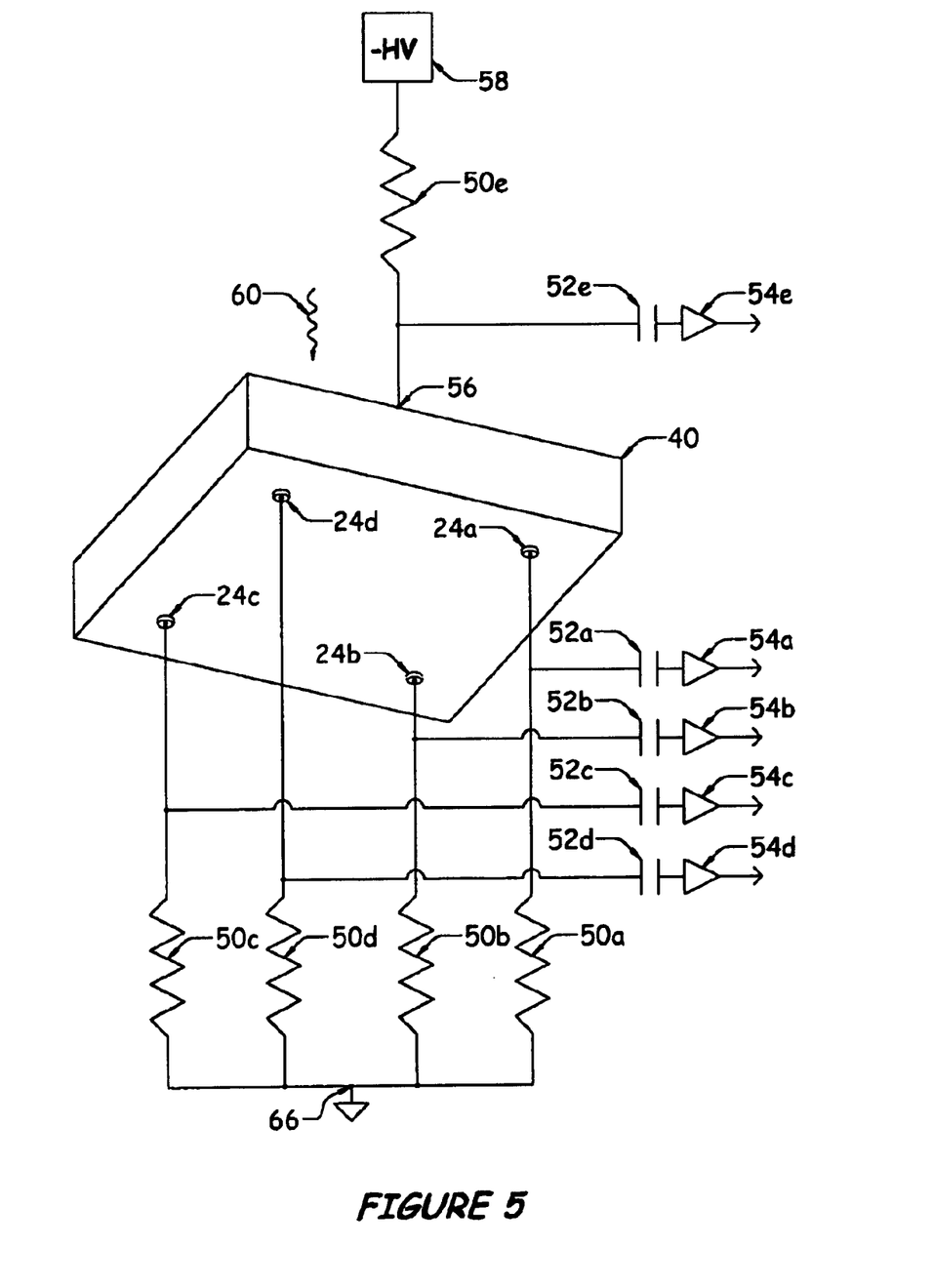
FIG. 5 is a schematic diagram showing a method of operating a corner contact Position Sensitive APD for two dimensional imaging.

In a preferred embodiment of this invention, a position sensitive avalanche photodiode 40 with four contacts 24a, 24b, 24c, 24d for rectangular two-dimensional imaging is reverse biased as shown in FIG. 5 using a high voltage power supply 58 and bias resistors 50a, 50b, 50c, 50d, 50e. The signal from the anode contact 56 is connected to a charge sensitive preamplifier 54e through a capacitor 52e. The signal from the anode preamplifier 54e is processed by a fast amplifier and discriminator to provide a timing pulse to trigger pulse height digitization and/or for coincidence determination. This same signal can also be processed by a slower pulse shaping amplifier to provide a total energy measurement for each detected event. The signals from the cathode contacts 24a, 24b, 24c, 24d are connected to charge sensitive preamplifiers 54a, 54b, 54c, 54d through capacitors 52a, 52b, 52c, 52d and the resulting signals are processed by a slower amplifier. The signals from the four cathode contacts are processed by slower pulse shaping amplifiers, and an A/D board in a computer is used to digitize the pulse heights for each detected event. A computer program, electronic circuit, or other means is then used to calculate an X-Y position for the detected event from the digitized pulse heights. The total energy for the detected event can also be calculated from the sum of the individual pulse heights.

In another embodiment of this invention involving a capacitively coupled position sensitive readout, the APD is reverse biased as shown in FIG. 5 with only one cathode contact 46, and signals from capacitive readout contacts 48a, 48b, 48c in FIG. 4C are connected to coupling capacitors 52e, 52a, 52b, 52c.

Some examples of how to convert the signals from a position sensitive APD into Cartesian or polar coordinates are as follows. For the contact schemes in FIGS. 3A and 3B, the X and Y coordinates are determined from $$X = \frac{(A+B)-(C+D)}{A+B+C+D}; \quad Y = \frac{(A+C)-(B+D)}{A+B+C+D}$$

In FIG. 4B, the polar coordinates are determined from $$r - r_o = \frac{A}{A+B+C}; \quad \theta = \frac{2\pi B}{B+C}$$

In FIG. 4C, the X and Y coordinates are determined from $$X = \frac{2A}{A+B+C}; \quad Y = \frac{2B}{A+B+C}$$

In the equations above the values A, B, C, D are taken to be the peak pulse heights of the signals from pulse shaping amplifiers connected to the charge sensitive preamplifiers 54a, 54b, 54c, 54d respectively. An important aspect of the present invention is that by including bias resistor 50e, the anode signal from charge sensitive preamplifier 54e corresponds to the total energy of radiation incident at any point within the active area of the detector. Furthermore, when the incident radiation is pulsed, it is possible to determine time of incidence from the same signal, for example by using a discriminator. Other variations on this approach are possible, including inserting the bias resistor 50e between the summing point 66 of bias resistors 50a, 50b, 50c, 50d and ground. The inventors recognize that these and similar approaches of obtaining an anode signal could be applied to prior art pixilated detectors as well, with the advantage over prior art of providing a single channel for energy and/or timing information for events detected in any pixel element of the device.

Other position sensitive readouts are possible and are included in the scope of this invention, including methods based on signal rise time encoding. In the case of using rise time encoding, time-to-amplitude converters could be used to produce each of the A,B,C,D signals, with the start signals provided by a discriminator triggering off a fast shaping connected to preamplifier 54e, and the stop signals provided by discriminators triggering off of slower shaping amplifiers connected to preamplifiers 54a, 54b, 54c, 54d for the A, B, C, D signals respectively. This and other methods of rise time encoding are well known to those of ordinary skill in the art.

Figure 7:
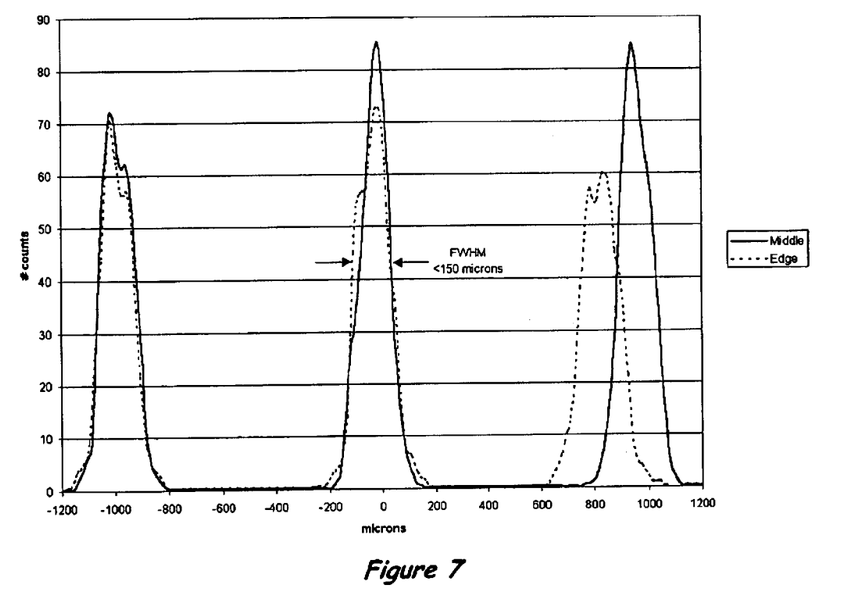
FIG. 7 details the spatial resolution achieved in the boxes shown in FIG. 6A.

FIGS. 6 and 7 show the spatial resolution response that can be easily obtained using the biasing and pulse measurement configuration shown in FIG. 5 with the readout structure shown in FIG. 3A and 3B.

FIG. 6A shows an example of the imaging performance that can be obtained with a comer contact configuration, and FIG. 6B an arc terminated comer contact configuration. The APD was at room temperature, and low cost preamplifiers with ~350 electrons input noise were used. The excitation source was a 25 um spot from a pulsed 632 nm LED stepped through a 12×12 array with 1 mm pitch. The images are one color representations of the results obtained from ~750 input pulses at each point in the array. FIG. 7 shows a profile of the distribution of detected positions inside the two boxes shown in FIG. 6A.

Figure 8A:
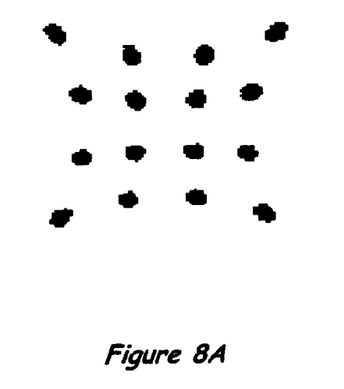
FIGS. 8A and 8B show the results of using a two dimensional Position Sensitive APD to detect 662 keV gamma rays from $^{137}$Cs using proximity focused scintillator arrays with 2 mm×2mm elements.
Figure 8B:
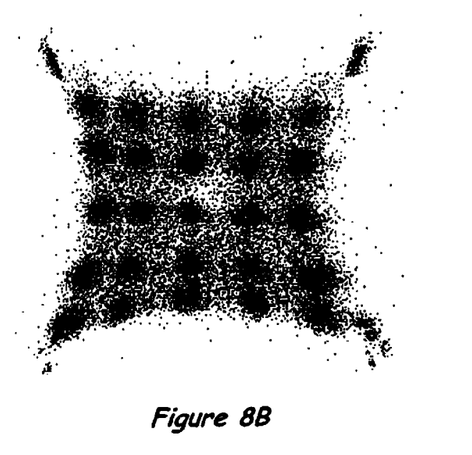

FIG. 8A shows the results of detecting 662 keV gamma rays with proximity focused scintillator arrays consisting of a 4×4 array of 2 mm×2 mm×10 mm CsI(T1) elements on 2.2 mm centers and FIG. 8B a 5×5 array of 2 mm×2 mm×10 mm LSO elements on 2.2 mm centers.

Figure 9A:
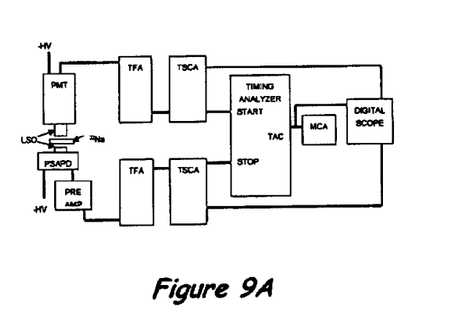
FIG. 9A shows a block diagram of the system used to measure timing resolution capabilities of the Position Sensitive APD in gamma ray detection applications
Figure 9B:
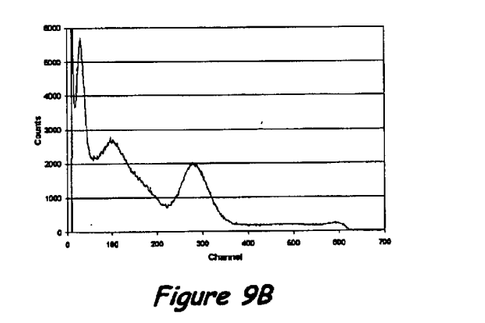
FIG. 9B shows the $^{22}$Na spectra obtained using LSO scintillator blocks coupled to the Photomultiplier tube (PMT) of the system in FIG. 9A.
Figure 9C:
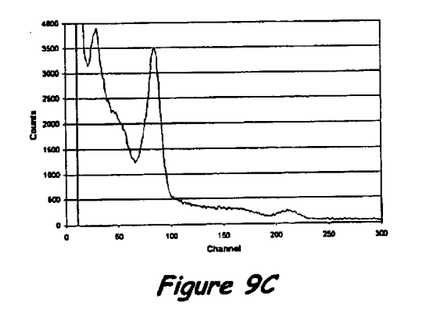
FIG. 9C shows the $^{22}$Na spectra obtained using LSO scintillator blocks coupled to the Position Sensitive APD (PSAPD) of the system in FIG. 9A.
Figure 9D:
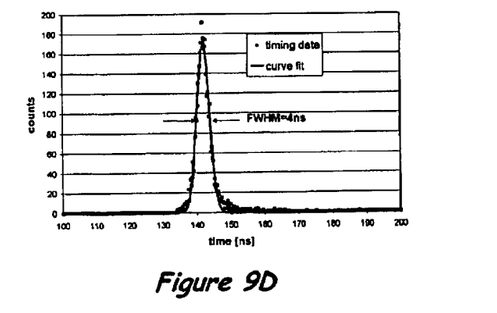
FIG. 9D shows the measured timing resolution of the Position Sensitive APD with the PMT for detecting coincidence of gamma rays from $^{22}$Na using in LSO scintillator blocks, using the system shown in FIG. 9A.

FIG. 9A shows a schematic of the system used to measure the timing resolution of a two dimensional Position Sensitive APD (PSAPD) relative to a photomultiplier tube (PMT). Both the Position Sensitive APD and the PMT were coupled to LSO scintillator blocks. The $^{22}$Na spectra for the PMT is shown in FIG. 9B and for the Position Sensitive APD in FIG. 9C. The signal from each detector was connected to timing filter amplifiers (TFAS) to shape the preamp signals and give them some gain. The fast, shaped signals were then connected to timing single channel analyzers (TSCAs) in order to place a threshold around the 51 1keV energy. The output of the TSCAs is a 5V logic pulse if the signal was within the specified energy window. The output of the TSCAs were sent to the start and stop of a timing analyzer which produces a pulse with an amplitude that is directly proportional to the time difference between the start and the stop. The output of the timing analyzer was sent to a multi-channel analyzer (MCA), and the peak indicating a 4 ns timing resolution between the two detectors is shown in FIG. 9(d).

Figure 10A:
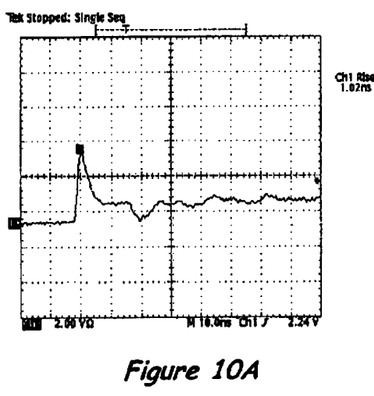
FIGS. 10A and 10B show the rise time for the signal generated by an alpha source in a two dimensional Position Sensitive APD.
Figure 10B:
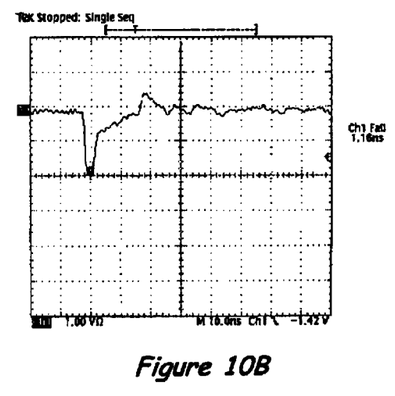

FIG. 10A shows the results of measuring the rise time of the Position Sensitive APD with high voltage on the anode contact and signal out directly (no preamp) from the cathode contacts. FIG. 10B shows the rise time of the Position Sensitive APD with high voltage on the cathode contacts and signal directly (no preamp) out of the anode contact. An alpha source was used to produce a signal in the APD because it deposits a large amount of energy in a very short period of time (<1ns).

CONCLUSION, RAMIFICATIONS, AND SCOPE

We have developed a non-pixilated solid state detector with internal gain that is capable of reporting the position of incidence of radiation, and a method of obtaining a signal from a single contact of the device that can be processed to determine the total incident energy, and, if the radiation is pulsed, the time of incidence. This detector is similar to prior art APDs in that it has internal gain; however, it uses a special readout technique to determine the position of incidence, and when desired energy and timing information. Benefits of this readout technique include:

- Measurement of the position of incidence over an extended area with zero dead space
- Small number of readout circuits to accomplish a high resolution measurement
- Unique readout geometries can be readily accomplished (e.g.linear, radial, X-Y)
- Single pulse detection, as opposed to CCD or other polled-readout detectors
- Single signal produced separate from position determining signals that indicates total incident energy, and timing when the radiation is pulsed, regardless of the position of incidence.

While the above description contains many specifications, these should not be construed as limitations of the scope of the invention, but rather as an exemplification of one preferred embodiment thereof. Many other variations are possible.

For example, the avalanche photodiode could be an n on p structure, in which case the roles of anode and cathode would be reversed. In addition, the avalanche diode could utilize a reach-through structure. This text assumes fabrication of an APD using a silicon substrate, but many other semiconductor materials could be used, including GaAs. In addition, solid state devices with internal gain such as solid state photomultipliers (SSPMs), which use impact ionization of shallow impurity donor levels to create an avalanche multiplication instead of exciting an electron-hole pair across the entire band gap as in an APD, could be used. Because the fields in SSPMs are much lower than the fields in APDs, it can be possible to avoid the use of a field spreading structure 30 and the precautions associated with its use. However, the electronics and low temperature required for effective readout of the signal from SSPMs can make them less desirable than APDs in many applications.

Other position-sensitive charge separation techniques could be used and are considered to be within the scope of this invention. For example, contact patterns such as those shown in FIG. 4B and FIG. 4C could be applied directly to the cathode of an APD, and methods well known to those of ordinary skill in the art for isolating pixel-like structures could be used to separate charge onto the various cathode contacts. Unlike a pixilated device, however, this embodiment would support high resolution position determination over an extended area with far fewer electrical contacts to the device.

Figure 11:
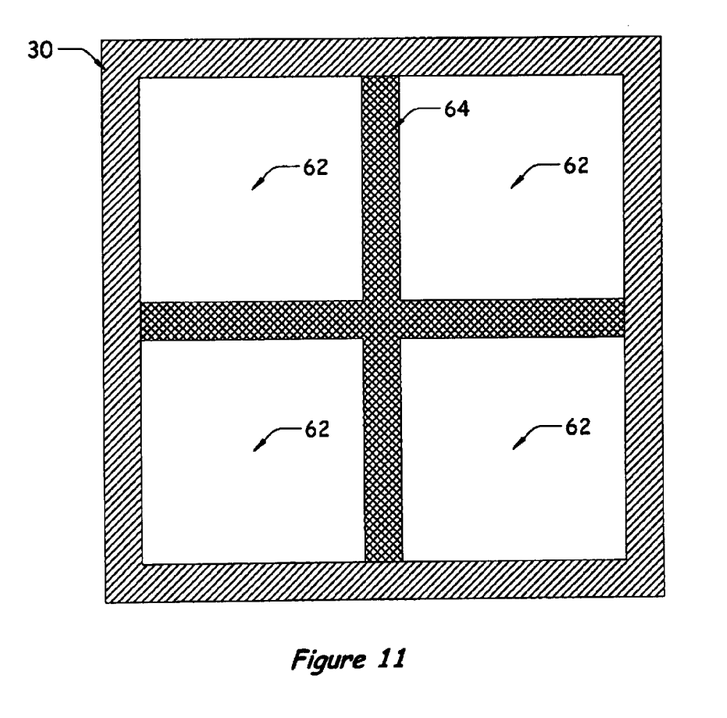
FIG. 11 shows an embodiment where more than one continuous active area device is fabricated on a single substrate.

Another variation within the scope of this invention would be the fabrication of more than one continuous area 62 on a monolithic substrate, where each continuous area 62 is capable of independent position sensitive readout. In this case, the perimeter of the substrate must include a field spreading structure 30. It can be beneficial to include an isolating structure 64 to minimize crosstalk between adjacent continuous areas as shown in FIG. 11. Examples of suitable isolating structures include any of the field spreading approaches shown in FIGS. 2A, 2B, and 2C, as well as methods described in prior art for isolating pixels and pixel-like structures on an APD.

The detector described in this invention is capable of position sensitive detection of pulses of energy in a variety of forms, including but not limited to: pulses of light, single photons, alpha particles, beta particles, and electrons in a vacuum tube detector. Materials such as scintillators and phosphors convert radiation such as gamma rays or x-rays into pulses of light that can easily be proximity focused onto the detector. It is also possible to use this device to detect the position of incidence, and if desired, variations in intensity, of a continuous beam of radiation using continuously sampling, rather than pulse detecting, readout electronics. In this variation, the diameter of the incident beam is not critical to determining the intensity-weighted center of incidence. The issues relating to beam position determination are well known to those of ordinary skill in the art.

Another variation within the scope of this invention is position sensitive detection while operating a solid state detector in non-proportional mode. For example, an APD operated in non-proportional mode is reverse biased at a few volts beyond breakdown, so that its gain approaches infinity each time an avalanche event starts. In this mode it is desirable to have a means for quenching the avalanche before the excessive current causes the device to fail. Suitable quenching methods are well known to those of ordinary skill in the art, for example using sufficiently large bias resistors 50 so the bias across the APD drops below breakdown as the current in the device increases, as well as active methods that adjust the effective bias voltage across the device when the current rises above a certain level.

What is claimed is:

1. An apparatus for determining the position of incidence of radiation, comprising:
   a solid-state device with internal gain, and
   a means for using charge separation to obtain electrical signals from said device in response to incidence of radiation,
   whereby the position of incidence of radiation is calculated using a plurality of said electrical signals.

2. The apparatus of claim 1, wherein said solid-state device is an avalanche photodiode.

3. The apparatus of claim 2 further comprising a guard ring field spreading structure to prevent edge breakdown under high reverse bias.

4. The apparatus of claim 2 further comprising a diffused bevel field spreading structure to prevent edge breakdown under high reverse bias.

5. The apparatus of claim 2 further comprising a mechanical bevel field spreading structure to prevent edge breakdown under high reverse bias.

6. The apparatus of claim 1, wherein said solid-state device is a solid state photomultiplier.

7. The apparatus of claim 1, further comprising:
   a means for calculating from said electrical signals the energy of the incident radiation.

8. The apparatus of claim 7, wherein said solid-state device is an avalanche photodiode.

9. The apparatus of claim 1, further comprising:
   a means for calculating from said electrical signals the energy of the incident radiation, and
   a means for calculating from said electrical signals the time of incidence of pulsed radiation.

10. The apparatus of claim 9, wherein said solid-state device is an avalanche photodiode.

11. The apparatus of claim 1, wherein said calculation of said position of incidence of radiation corrects for geometric distortion of position information in said electrical signals.

12. The apparatus of claim 1, wherein said electrical signals are obtained by resistive, rise time, or capacitive coupling.

13. The apparatus of claim 1, wherein said electrical signals are obtained by inductive coupling.

14. The apparatus of claim 1 further comprising at least one scintillator element coupled to said solid state device, wherein said scintillator produces said radiation.

15. An apparatus for determining the position of incidence of radiation, comprising:
   a solid-state device with internal gain,
   a plurality of electrically conductive structures that use charge separation to obtain electrical signals from said device in response to incidence of radiation, and
   a means for calculating the position of incidence of radiation using a plurality of said electrical signals.

16. The apparatus of claim 15, wherein said solid-state device is an avalanche photodiode.

17. The apparatus of claim 16, further comprising a guard ring field spreading structure to prevent edge breakdown under high reverse bias.

18. The apparatus of claim 16, further comprising a diffused bevel field spreading structure to prevent edge breakdown under high reverse bias.

19. The apparatus of claim 16, further comprising a mechanical bevel field spreading structure to prevent edge breakdown under high reverse bias.

20. The apparatus of claim 15, wherein said solid-state device is a solid state photomultiplier.

21. The apparatus of claim 15, further comprising:
   a means for calculating from said electrical signals the energy of the incident radiation.

22. The apparatus of claim 21, wherein said solid-state device is an avalanche photodiode.

23. The apparatus of claim 15, further comprising:
   a means for calculating from said electrical signals the energy of the incident radiation, and
   a means for calculating from said electrical signals the time of incidence of pulsed radiation.

24. The apparatus of claim 23, wherein said solid-state device is an avalanche photodiode.

25. The apparatus of claim 15, further comprising:
   one or more termination lines between the conductive structures, disposed to eliminate geometric distortion in the electrical signals.

26. The apparatus of claim 15, further comprising:
a means of correcting for geometric distortion in coordinates calculated from said electrical signals using a termination line or lines between said conductive structures.

27. The apparatus of claim 15, wherein said means for calculation of said position of incidence of radiation corrects for geometric distortion of position information in said electrical signals.

28. The apparatus of claim 15, wherein said radiation is produced by at least one scintillator element.

29. The device of claim 15 wherein a region of said solid-state device between said electrically conductive structures has a higher resistivity than said plurality of electrically conductive structures.

30. A method for determining the position of incidence of radiation on a solid state device with internal gain, comprising:
arranging a plurality of electrically conductive structures with respect to said solid state device that obtain by charge separation electrical signals from said device in response to incidence of radiation, and
calculating the position of incidence of said radiation using a plurality of said electrical signals.

31. The method of claim 30, wherein said solid-state device is an avalanche photodiode.

32. The apparatus of claim 31 further comprising a guard ring field spreading structure to prevent edge breakdown under high reverse bias.

33. The apparatus of claim 31 further comprising a diffused bevel field spreading structure to prevent edge breakdown under high reverse bias.

34. The apparatus of claim 31 further comprising a mechanical bevel field spreading structure to prevent edge breakdown under high reverse bias.

35. The method of claim 30, wherein said solid-state device is a solid state photomultiplier.

36. The method of claim 30, further comprising processing said electrical signals to correct for geometric distortion of position information.

37. The method of claim 30, wherein said radiation is produced by at least one scintillator element.

38. The method of claim 30, wherein said calculating said position of incidence uses electrical signals obtained by resistive, rise time, or capacitive coupling of said electrical signals to an amplifier.

39. The method of claim 30, wherein said calculating said position of incidence uses electrical signals obtained by inductive coupling of said electrical signals to an amplifier.

40. A method of measuring the energy of incident radiation on a position sensitive solid state detector with internal gain, comprising:
extracting an electrical signal from a single contact that indicates the total energy incident on said detector, and
calculating said total incident energy from said electrical signal.

41. The method of claim 40, further comprising obtaining the time of incidence from said electrical signal.

42. An apparatus for determining the position of incidence of radiation, comprising:
a solid-state device with internal gain that uses charge separation to obtain electrical signals from said device in response to incidence of radiation on said solid-state device,
wherein the position of incidence of radiation on said solid-state device is calculated using a plurality of said electrical signals.

43. The apparatus of claim 42, wherein said solid-state device is an avalanche photodiode.

44. The apparatus of claim 43 further comprising a guard ring field spreading structure to prevent edge breakdown under high reverse bias.

45. The apparatus of claim 43 further comprising a diffused bevel field spreading structure to prevent edge breakdown under high reverse bias.

46. The apparatus of claim 43 further comprising a mechanical bevel field spreading structure to prevent edge breakdown under high reverse bias.

47. The apparatus of claim 42, wherein said solid-state device is a solid state photomultiplier.

48. The apparatus of claim 42, further comprising:
a means for calculating from said electrical signals the energy of the incident radiation.

49. The apparatus of claim 48, wherein said solid-state device is an avalanche photodiode.

50. The apparatus of claim 42, further comprising:
a means for calculating from said electrical signals the energy of the incident radiation, and
a means for calculating from said electrical signals the time of incidence of pulsed radiation.

* * * * *